Jan. 12, 1960
W. DERGANC
2,920,485
PYROMETER
Filed Jan. 11, 1955
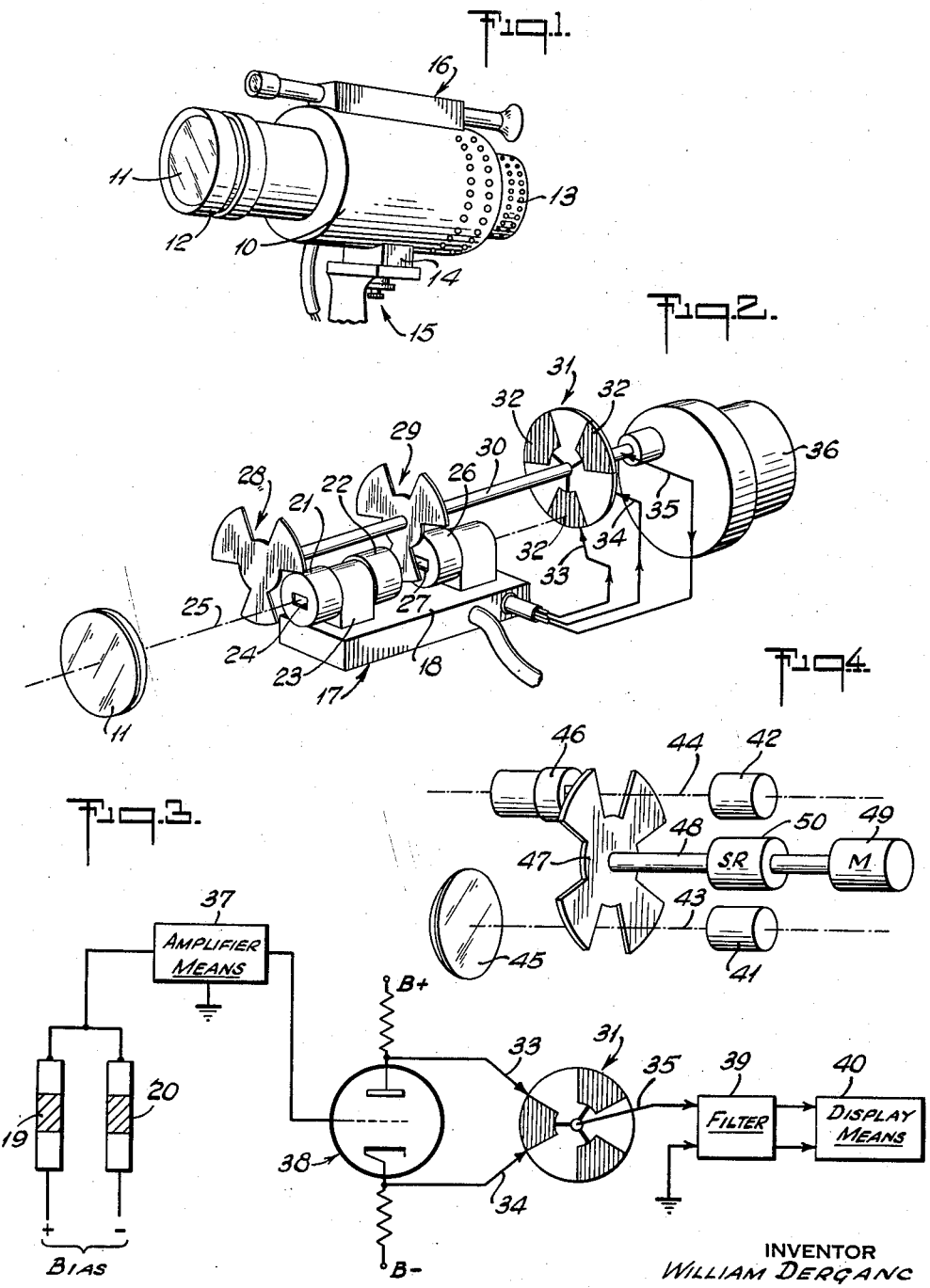
INVENTOR
WILLIAM DERGANC
BY
Mitchell & Bechert
ATTORNEYS

United States Patent Office 2,920,485
Patented Jan. 12, 1960

2,920,485

PYROMETER

William Derganc, Centerport, N.Y., assignor to Servo Corporation of America, New Hyde Park, N.Y., a corporation of New York Application January 11, 1955, Serial No. 481,124

12 Claims. (Cl. 73—355)

My invention relates to an improved optical-pyrometer construction.

It is an object of the invention to provide an improved device of the character indicated.

It is another object to provide a more compact, rugged and reliable optical pyrometer for continuously yielding electrical signals reflecting optically collected thermal energy.

It is a specific object to provide an improved pyrometer of the character indicated, yielding a D.C.-output signal which reflects the instantaneous temperature differences between a known and an unknown source of heat radiations.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a view in perspective of an optical pyrometer incorporating features of the invention;

Fig. 2 is a somewhat exploded, enlarged, and simplified perspective view of important functioning parts within the pyrometer of Fig. 1;

Fig. 3 is an electrical circuit diagram illustrating connections within and to the device of Figs. 1 and 2; and Fig. 4 is a diagram illustrating a modification.

Briefly stated, my invention contemplates a pyrometer employing two like thermally responsive cells differentially connected and so electrically processed as to yield a continuous D.C.-output signal; this output signal reflects optical observations of the temperature of an unknown source, with respect to that of a reference or known source. My pyrometer incorporates chopping means synchronously exposing both cells and cutting off both cells; and, synchronized with the chopping means, I provide synchronous-rectifier means functioning in response to the differential electrical output of the cells to yield a full-wave-rectified D.C. signal.

Referring to Figs. 1 and 2 of the drawings, my invention is shown in application to a pyrometer contained within a generally cylindrical housing 10 having a predominant elongated axis. Collecting optical apparatus in the form of an infrared-transmitting lens 11, as of arsenic-trisulfide glass, may be adjustably mounted in a barrel 12, on the axis of housing 10, and at one end thereof. Motor means for driving mechanical parts within the assembly may be contained within a suitably vented rear part 13 of the assembly, the latter being again preferably located on the same predominant longitudinal axis of the assembly. A lower part of the housing may carry a mounting block 14, to be removably secured to tripod means 15, and visual-sighting means 16 may be fixedly mounted in parallel alignment with the axis of optical apparatus 11 on the upper side of the housing 10.

I prefer that all electronic components involved in developing the D.C.-output signal of my pyrometer be contained within a compact rectangular-prismatic chassis 17, contained within the housing 10 and having an elongated mounting surface 18 for rugged support of two like thermally responsive cell elements 19—20 (see Fig. 3) in close proximity to the chassis 17. In the form shown, the cell elements 19—20 may be suitably mounted thermistor flakes and are respectively contained in separate capsules 21—22 (Fig. 2), secured to a rugged standard 23 on the top surface 18 of the chassis 17. The capsules 21—22 may have infrared-transmitting windows, as at 24, facing predominantly on a common axis such as the axis 25 of the optics 11, which preferably is also the predominant axis of the pyrometer assembly. The window (not shown) for the capsule 22 will be understood to face in the opposite direction, and thus away from capsule 21 and to the rear of the assembly.

In accordance with a feature of the invention, I provide within the pyrometer housing 10, and also preferably ruggedly secured to the chassis 17, a reference source or "black body" 26. The "black body" may be a carefully regulated source of thermal energy, and may be contained within the housing 26 axially exposed to the window of capsule 22 through a window 27. It will be understood that known techniques will be employed for so regulating the source 26 that the same may constitute a reference on which pyrometer observations may be based.

In accordance with a further feature of the invention, I employ synchronous chopper means functioning simultaneously to expose and to cut off radiations impinging upon the respective cells 19—20 within capsules 21—22. In the form shown, the chopper means comprises two multiple-bladed choppers 28—29, mounted on a common shaft 30 and parallel to but offset from the axis 25. The blades of both choppers are preferably of equal angular width and spacing; in the case of chopper 28, the blades cut axially between lens 11 and window 24, and in the case of chopper 29, the blades cut axially between the capsule 22 and the source 26. The choppers thus provide at the input to amplifier means 37 an A.C. signal at the interruption frequency.

In order to develop a D.C.-output signal in conjunction with electronic components to be described, I employ a synchronous rectifier synchronized with rotation of the shaft 30. In the form shown, this rectifier is of the mechanical variety, employing a commutator plate 31 mounted on the shaft 30 and having conductive segments 32 of width and spacing corresponding to the effective width and spacing of chopper blades. The phase-displaced stationary contacts 33—34 for the rectifier 31 should contact the plate 31 at spaced locations representing the chopper-blade width or an odd-integer multiple thereof, as will be understood. Commutator output may be available from a brush 35 common to the conducting segments 32. To complete the description of the mechanical parts, the motor 36 for continuously driving the shaft 30 is preferably mounted with its predominant axis on the predominant axis of the pyrometer assembly, and since the motor 36 shown incorporates a gear-reduction mechanism, it is convenient to provide the drive output to the offset shaft 30.

The electrical circuitry within the chassis 17 may involve simple components, and I have shown in Fig. 3 amplifier means 37 responsive to the differential combination of the outputs of cells 19—20 (e.g. thermistor flakes), which may be bridge-connected and oppositely polarized. In order to feed the synchronous rectifier 31, I have provided a phase-splitter in the form of a triode 38 having a plate-output connection and a cathode-output connection to the respective phase-displaced inputs 33—34 of the synchronous rectifier. The output of the synchronous rectifier will be a full-wave rectified signal, which may be filtered within chassis 17 or externally, as at 39, for recording or display at 40 as a steady D.C. signal.

In Fig. 4, I show a modified organization of parts representing a simplification of the chopper. The two like thermally responsive cells may be contained in capsules 41—42 ruggedly mounted (by means not shown) and facing predominantly on axes 43—44 parallel to each other. The lens 45 may serve as the collecting optical apparatus and focus the source of known radiations on the cell within capsule 41, and a source of known radiations may be contained within a fixedly mounted housing 46, as in the case of the source 26 in Fig. 2. The chopper may comprise a single disc 47 mounted for rotation on a shaft 48 parallel to the two spaced axes 43—44 and continuously driven by motor 49. The synchronous rectifier 50 may also be mounted on the shaft 48. For the preferred arrangement shown, the shaft 48 is symmetrically disposed between the two axes 43—44, and the number of blades on chopper 47 is even, so that both cells will be exposed and both cells will be cut off concurrently.

It will be seen that I have described a configuration and combination for obtaining field temperature measurements of remote thermal sources. The output signals are always D.C., having an intensity reflecting the differential comparison of the unknown source with the known. While exposure to the known and to the unknown may alternate, I prefer simultaneous exposures as described, in order to develop a truly differential signal. The device incorporates provision for pre-amplification immediately adjacent the cells, thereby assuring a good signal-to-noise condition at the input to the synchronous rectifier, and there is no chance of losing synchronization of the choppers or of the rectifier.

While I have described the invention in detail for the preferred forms shown, it will be understood that modifications may be made within the scope of the invention as defined in the claims which follow.

I claim:

1. An optical pyrometer, comprising two like thermally responsive electrical elements, means for exposing one of said elements to a source of unknown radiations, a source of known radiations aligned for exposure to the other of said elements, chopping means for synchronously chopping exposure of said respective elements to the unknown and known sources, means including a phase-splitter electrically responsive to the differential output of said elements, and means including a synchronous rectifier responsive to the output of said phase-splitter and synchronized with operation of said chopper for converting the differential output of said elements into a D.C. signal.

2. An optical pyrometer comprising two like thermally responsive electrical elements, a reference source in optical alignment with one of said elements, said thermally responsive elements and said source being in the same general alignment and mounted on a common chassis, collecting optical apparatus for collecting energy from an unknown source and focusing the same on the other of said elements, two mechanical choppers, means continuously driving said choppers on a common shaft parallel to said alignment, one of said choppers being between said reference source and the adjacent thermally responsive element, the other of said choppers being between said optical apparatus and the other of said elements, so as to simultaneously expose said first element to said reference source and said second element to the unknown source and to simultaneously cut off said elements from said respective sources, and means responsive to the differential output of said elements for indicating the temperature difference between said reference and said unknown sources.

3. An optical pyrometer, comprising on a common axial alignment a first thermally responsive element and focusing optical apparatus for focusing thermal radiations from an unknown source upon said first element, a second thermally responsive element, and a known reference source mounted in face-to-face relation with said second element and generally on the same axial alignment as said optical apparatus and said first source; first and second choppers mounted on a common axis offset from the alignment axis of said elements, said respective choppers being in interrupting relation with energy impinging on said respective elements; means continuously driving said choppers in synchronism; and means including a synchronous rectifier synchronized with rotation of said choppers for developing a D.C. output reflecting the differential output of said elements.

4. A pyrometer according to claim 3, in which said synchronous rectifier includes a mechanical commutator mounted on the same shaft as said choppers and with segments of width and spacing equal to and in phase with the blades of said choppers.

5. An optical pyrometer comprising two like thermally responsive electrical elements facing generally on spaced parallel axes, a reference source of known radiations facing and in general alignment with one of said elements, focusing optical apparatus in general alignment with and facing the other of said elements, there being corresponding axial spaces between both elements and the source and optical apparatus respectively facing the same, a single chopper mounted for rotation on an axis generally parallel to but offset from both said first-mentioned axes and having blades extending into intermittent occulting relation with both said elements, means for continuously driving said chopper, means electrically differentially responsive to the outputs of said elements and means including a synchronous rectifier synchronized with chopper rotation for converting the differential output of said last-defined means into a D.C. signal.

6. A pyrometer according to claim 5, in which the number and placement of said blades and of the axis of rotation of said chopper are such that radiations impinging upon both elements are cut off simultaneously and are exposed simultaneously.

7. A pyrometer according to claim 5, in which the axis of rotation of said chopper is symmetrically intermediate the axes of said elements and in which the number of chopper blades is an even number.

8. An optical pyrometer, comprising an elongated assembly having a predominantly longitudinally extending axis, focusing optical apparatus including an infrared-transmitting lens at one end of said assembly and on said axis, a first thermally responsive cell on said axis and at the focus of said optical apparatus, a source of known radiations, a second thermally responsive cell in face-to-face relation with said source and on the side of said first cell away from said lens, each of said cells developing an electrical response from incident thermal radiation synchronous chopping means including blades passing between said source and said second cell and blades passing between said lens and said first cell and mounted on a common shaft offset from said axis, a synchronous-rectifier element also mounted on said shaft and oriented for functioning synchronously with chopping action, means including a phase-splitter responsive to the differential output of said cells, said synchronous rectifier being connected to the respective outputs of said phase-splitter, whereby a D.C. signal may be developed to reflect the differential output of said cells.

9. A pyrometer according to claim 8, in which said synchronous chopper includes a motor at the other end of said assembly.

10. A pyrometer according to claim 8, in which said assembly is contained within a housing having generally cylindrical confines predominantly on said axis.

11. A pyrometer according to claim 10, and including visual-sighting means mounted on an axis generally parallel to said first-mentioned axis and on one side of said cylindrical housing.

12. An optical pyrometer, comprising a rectangular prismatic electrical chassis having a predominant elongated mounting surface, two like cells and a known source of radiations rigidly mounted on said surface and facing predominantly on a common axis parallel to and offset from said surface, one of said cells and said source facing each other in close adjacency, the other of said cells facing predominantly away from said first cell and said source, an infrared-transmitting lens focused on said second cell, synchronous-chopper means including a shaft offset from said axis and two like choppers having blades of equal width and mounted respectively to interrupt radiations to said respective cells, a mechanical synchronous rectifier including a moving element carried by said shaft and mounted for operation in phase with interruption action of said choppers, means for continuously driving said shaft, electronic means contained within said chassis and including a phase-splitter responsive to the differential output of said cells and having two outputs connected to phase-displaced contacts of said synchronous rectifier, the phase displacement between said contacts being equivalent to an odd-integer multiple of the effective angular width of a chopper blade.

References Cited in the file of this patent

UNITED STATES PATENTS

| | | |
|---|---|---|
| 1,726,318 | Sharp et al. | Aug. 27, 1929 |
| 1,810,172 | Hayes | June 16, 1931 |
| 1,816,047 | Keuffel | July 28, 1931 |
| 2,096,323 | Gille | Oct. 19, 1937 |
| 2,356,238 | Gillett et al. | Aug. 22, 1944 |
| 2,517,554 | Frommer | Aug. 8, 1950 |
| 2,547,212 | Jamison et al. | Apr. 3, 1951 |
| 2,638,811 | Williams | May 19, 1953 |
| 2,673,297 | Miller | Mar. 23, 1954 |

FOREIGN PATENTS

| | | |
|---|---|---|
| 662,818 | Great Britain | Dec. 12, 1951 |
| 1,024,076 | France | Jan. 7, 1953 |
| 719,485 | Great Britain | Dec. 1, 1954 |

OTHER REFERENCES

Article: Industrial High Speed Infrared Pyrometer, Gorrill, in "Electronics," March 1949, pages 112–114.